UNITED STATES PATENT OFFICE.

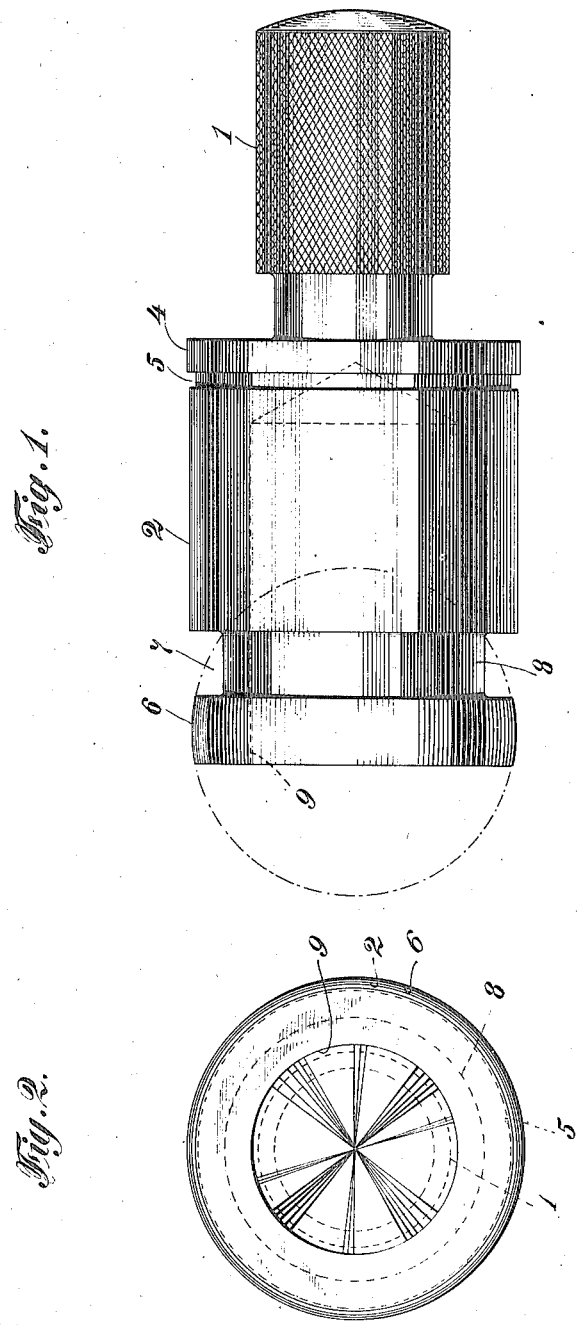

ALBERT A. MARTELL, OF WOONSOCKET, RHODE ISLAND, ASSIGNOR TO THE TAFT-PEIRCE MANUFACTURING COMPANY, OF WOONSOCKET, RHODE ISLAND, A CORPORATION OF RHODE ISLAND.

PLUG-GAGE.

1,393,233.  Specification of Letters Patent.  Patented Oct. 11, 1921.

Application filed April 15, 1918. Serial No. 228,608.

*To all whom it may concern:*

Be it known that I, ALBERT A. MARTELL, a citizen of the United States, residing at Woonsocket, in the county of Providence, State of Rhode Island, have invented certain new and useful Improvements in Plug-Gages, of which the following is a specification.

This invention relates primarily to measuring instruments and more particularly to gages.

The principal object of the present invention is to provide a pilot member for a gage in such manner that the pilot member acts as guide to facilitate alining the gage and the work piece to be tested.

A further and important object of the present invention is a gage provided with a guiding member so constructed that the guiding surface is separated from the test surface of the gage and constructed to facilitate alining the gage surface with the object to be tested.

A still further and important object of the present invention is a plug gage of the character specified wherein the pilot member comprises a disk having a curved work surface with the guiding surface of said disk spaced apart from the test surfaces on the body of the gage to permit a manipulation of the gage to aline the axis of the gage substantially with the axis of the opening being tested.

A further and important object of the present invention is a plug gage of the character specified wherein the body portion is recessed in such manner as to reduce the weight of the said body portion and with the recess so constructed that the metal mass around the axis of the gage is substantially uniform on all sides of the gage and whereby the recess extends substantially the length of the body portion of the gage.

A further object of the present invention is a gage as specified in the foregoing paragraph and wherein a handle is provided on the end of the gage and a cylindrical opening extends substantially through the body of the gage in such manner that the axis of the opening is substantially coincident with the axis of the body portion, whereby the wall of the body portion is of uniform thickness.

A still further object of the present invention is a gage as specified wherein the pilot member, the test surface, a limit gage surface, and a handle for the gage, all are formed from a single piece of material to comprise an integral gage member.

The present invention possesses many other advantageous features some of which, with the foregoing, will be set out more at length in the following description, wherein will be outlined in full that form of the invention which I have selected for illustration in the drawings accompanying and forming a part of the present specification, wherein—

Figure 1 is an elevational view of a plug gage embodying my invention.

Fig. 2 is an end view thereof.

In the drawings I have shown only one specific form of my generic invention, but it is to be understood that I do not limit myself to such form, because my invention may be embodied in a multiplicity of forms, each being a species of my invention. It is also to be understood that by the claims succeeding the description of my invention I desire to cover the invention in whatsoever form it may be embodied.

Gages of various types and characters in the art have heretofore, in the majority of cases, comprised a gage surface adapted to be applied at once to the work piece to which the gage is addressed or presented. In view of the accuracy and care with which modern machines are constructed, gages are used very largely to supplant calipers and templets heretofore employed for determining working dimensions. This is particularly true where standardized constructions are being manufactured. One of the important elements of cost now entering largely into manufactured articles is the cost of skilled labor. To this end economy demands that skilled labor be relieved of as much unnecessary manipulation as is possible, whereby a maximum amount of productions may be obtained with minimum labor cost. To this end piece work is largely the standard of wage. Piece work means rapidity of action, by which the finer types of work sometimes suffer. In the use of the gages heretofore common in the art the gage surface immediately contacted with the work being tested. The test surface of the gage must necessarily closely fit the surface being tested and it is evident that unless the gage were squarely presented to the surface being tested there was a liability of the end of the gage marring the work. This is particularly true where plug gages are quickly inserted into bearings of relatively soft material such as babbitt or soft bronze. Necessarily gages are hardened steel and often are heavy, so that a quick insertion of the gage may cut or scratch the bearing or may even produce a small bead or bur of material in the bearing which would later contact with the test surface of the gage and produce a false measurement. This difficulty was found to arise more especially where bearings on the interior of machines were being tested and where space in which the gage must be manipulated was little longer than the gage.

The present invention, which will later be explained more in detail, overcomes the difficulties of the prior art and at the same time increases the speed with which the engaging operation may be accomplished. One embodiment of the present invention comprises a plug gage preferably formed of a single piece of metal and comprising a handle that carries a body portion on which is provided a standard test surface adjacent which is a limit gage surface and preceding which is a pilot member. The novelty resides more especially in the provision of the pilot member, which may comprise a disk-like portion of slightly less diameter than the standard gage surface and is provided with a curved work face preferably comprising a portion of a spherical surface with the equatorial place of the spherical surface substantially bisecting the pilot work face in such manner that the intersection of any plane cutting the work surface of the pilot and including the center of the generating sphere will be a great circle of the sphere. The reason for this is that when the pilot is inserted within the opening to be gaged, the axis of the pilot may have a universal motion within the limits of the pilot work face, and the engagement of the pilot with the opening to be gaged will be identical for any position of the gage within that degree of movement specified. This obviates pinching the pilot against the work. Preferably the pilot work face is spaced apart a slight distance from the work face of the gage proper. This enables the gage to be moved as specified and then alined with the axis of the gage substantially coincident with the axis of the opening after the pilot has been inserted. To facilitate the "feel" of the gage it is desirable that the body of the gage should not be too heavy, and to this end the body portion of the gage is hollowed out by being provided with an opening which preferably corresponds in cross-section to the same shape as the surfaces of the gage and with the axis of the opening substantially coincident with the axis of the gage, whereby the walls of the gage portions are of substantially uniform thickness, so that during the tempering or ageing of the metal there is no tendency of the gage to be distorted by uneven molecular changes, such as would occur were the side walls of uneven thickness.

Referring now more particularly to the drawings, which illustrate a gage embodying my invention, the gage comprises a body portion carried by a handle 1, which preferably is knurled as is common in the art, and the middle portion of the body is formed of a definte predetermined dimension and comprises a standard test surface 2 usually referred to in the art as the "Go" gage head. The end of the body portion adjacent the handle is formed of a slightly larger dimension and comprises a limit gage head 4 known in the art as the "Not go" gage head. The standard gage head 2 is spaced from the limit gage head 4 by a groove 5 which facilitates grinding of the gage surfaces to accurate dimensions for the entire length of the gage surface. Work being gaged, which passes the standard or "Go" head and which will not pass the limit gage head or "Not go" portion 4, is work that is to be passed. Any work which will pass over the "Not go" portion is to be rejected.

It is desirable, in fact, essential, that the edges of the gage surface, more particularly, the standard or "Go" portion, shall be a right angle or a sharp edge; otherwise there is a tendency of forcing the gage into the bearing whereby the "feel" of the gage is destroyed or uncertain. Because of the necessity of this sharp angle, as has been previously explained, rapid manipulation often scars delicate work. To prevent this scarring and to facilitate rapidity of gaging, the pilot head, previously referred to, is provided. This pilot head, in the preferred form, comprises the pilot surface 6 which, as previously explained, preferably is a portion through the equatorial belt of a sphere. In order to facilitate the manipulation of the gage to its best advantage this pilot surface itself is spaced apart from the standard gage surface by means of a relatively wide groove 7, which forms a neck 8 connecting the standard gage head and the pilot head. To facilitate the "feel" of the gage it is hollowed out by providing a cylindrical opening 9 that extends substantially throughout the body portion and with the axis of the opening substantially coincident with the axis of the body portion.

The actual use of the present gage shows its advantages and utilities in the art and more particularly demonstrates the great value of a curved surfaced pilot member.

Claims:

1. As an article of manufacture a gage comprising a body portion a standard gage head on said body portion, a limit gage head on the body portion adjacent the standard gage head, and a pilot head also on the body portion and adapted to precede the gage heads to guide the gage heads accurately relatively to the member being gaged, said pilot head comprising a member spaced apart from the standard gage head and having its work surface comprising a portion of a sphere the diameter of which is slightly less than the diameter of the standard gage head.

2. In a gage of the character specified a relatively long body portion, a standard gage head upon said body portion, a limit gage head adjacent the standard gage head and separated therefrom by an annular groove, a pilot head having its work surface formed to comprise a portion of a spherical surface, with the diameter of said pilot head slightly less than the diameter of the standard gage head, said pilot head being separated from the surface of the standard gage head by a restricted neck portion, and a handle extending from the body portion with the axis of the handle substantially coincident with the axis of the body portion, said body portion being provided with a cylindrical opening to reduce the weight of the body portion with the axis of the said opening substantially coincident with the axis of the handle.

3. A gage comprising in combination a cylindrical body portion of predetermined size comprising the gaging head to which the work piece being tested is required to conform, and a guiding member adapted to guide the work piece to be gaged relatively to the gaging head, said guiding member having its work surface comprising an equatorial portion of a spherical surface.

4. A gage of the character specified comprising in combination a body having a cylindrical portion provided with a gage surface thereon and terminating at the forward end in a sharp angular edge, and a pilot member having a work surface curved in two directions and carried by the body and adapted to engage the work piece prior to engagement thereof with the gage and to direct said gage into the work piece.

5. A gage device of the character specified comprising a cylindrical body portion provided with a gage surface thereon and terminating at the forward end in a sharp angular edge, a rounded edged disk comprising a pilot member and spaced apart from the gage surface in such manner as to enter the work piece prior to entrance of the gage surface therein, and a handle for manipulating the said device, the body portion of the said gage being provided with a cylindrical opening, the parts being constructed and arranged in such manner that said opening, the surface of said pilot, said gage surface, and said handle all have a common axis.

6. As an article of manufacture a gage provided with a body portion having gaging surfaces thereon, the front edge of the forward gaging surface forming substantially a right angle with the side wall of a groove in the body portion, and a pilot adapted to engage work prior to its contact with the said gaging surfaces said pilot member comprising a portion having a rounded contact guiding surface, said groove being between the pilot member and the gaging surfaces whereby angular movement may be permitted between the pilot member and the work to be gaged after the pilot member has been inserted in such manner as to aline the gaging surfaces properly with the work thereby facilitating the gaging operation.

7. As an article of manufacture, a gage of the character specified comprising a body portion provided with a cylindrical gage portion terminating in a right angled advancing edge, pilot means comprising a rounded guiding member adapted to precede the gage portion in contact with the work to be gaged, the said gage being provided with a groove between the pilot means and the dimensioning means whereby angular movement of the gage may be provided with the pilot means in contact with the work to facilitate alining the gage with the work in such manner as to facilitate the gaging operation.

ALBERT A. MARTELL.